United States Patent [19]

Beall et al.

[11] Patent Number: 5,744,208

[45] Date of Patent: Apr. 28, 1998

[54] GLASS-CERAMICS CONTAINING LITHIUM DISILICATE AND TRIDYMITE

[75] Inventors: George H. Beall, Big Flats; Jeffrey T. Kohli, Corning, both of N.Y.

[73] Assignee: Corning Incorporated, Corning, N.Y.

[21] Appl. No.: 265,192

[22] Filed: Jun. 24, 1994

[51] Int. Cl.$^6$ ........................................ G11B 5/66
[52] U.S. Cl. ........................ 428/64.1; 428/64.2; 428/64.3; 428/64.4; 428/65.3; 428/694 ML; 428/694 ST; 428/694 SG; 428/900; 501/3; 501/4; 501/5; 501/6; 501/7; 501/8; 501/9
[58] Field of Search ........................ 423/64.1, 64.2, 423/64.3, 64.4, 694 ML, 694 ST, 65.3, 694 SG; 501/3, 4, 5, 6, 7, 8, 9

[56] References Cited

U.S. PATENT DOCUMENTS

| | | | |
|---|---|---|---|
| 2,933,857 | 4/1960 | Stookey | 65/33.3 |
| 4,213,789 | 7/1980 | Bartha et al. | 501/73 |
| 4,303,449 | 12/1981 | Bartha et al. | 501/128 |
| 4,473,653 | 9/1984 | Rudoi | 501/4 |
| 4,480,044 | 10/1984 | McAlinn | 501/4 |
| 4,515,634 | 5/1985 | Wu et al. | 106/35 |
| 4,764,233 | 8/1988 | Ogihara et al. | 156/89 |
| 4,833,001 | 5/1989 | Kijima et al. | 428/141 |
| 4,859,505 | 8/1989 | Nakayama et al. | 427/305 |
| 4,880,677 | 11/1989 | Hecq et al. | 428/38 |
| 4,971,932 | 11/1990 | Alpha et al. | 501/3 |
| 5,045,402 | 9/1991 | Adams, Jr. et al. | 428/545 |
| 5,093,173 | 3/1992 | Nakagawa | 428/65.4 |
| 5,173,453 | 12/1992 | Beall et al. | 501/4 |
| 5,176,961 | 1/1993 | Crooker et al. | 428/409 |
| 5,185,215 | 2/1993 | Adams, Jr. et al. | 428/545 |
| 5,219,799 | 6/1993 | Beall et al. | 501/5 |

FOREIGN PATENT DOCUMENTS

62-72547 of 1986 Japan.
6272547 of 1986 Japan.
43793-1987 of 1987 Japan.

OTHER PUBLICATIONS

West, A.R. & Glasser, F.P., "Crystallization of $Li_2O-SiO_2$ Glasses", *Advances in Nucleation and Crystallization in Glasses*, 1971, pp. 151–165.

Strnad, Z., "Glass–Ceramic Materials", *Glass Science and Technology* 8, 1986, pp. 80–81.

McMillan, P.W., "Glass–Ceramics", 1979, pp. 48 and 151, and 116–120.

*Primary Examiner*—Leszek Kiliman
*Attorney, Agent, or Firm*—Timothy M. Schaeberle; Edward F. Murphy

[57] ABSTRACT

This invention is directed at the makings of glass-ceramic which is uniquely suited for use as a disc substrate for utilization in a magnetic memory storage device. The glass ceramic material exhibits a crystal phase assemblage comprised predominately of a mixture of lithium disilicate and tridymite which are uniformly interspersed with a residual glass phase and form an interlocked microstructure with the glass. The composition consists essentially, expressed in terms of weight percent on the oxide basis, of 75–95% $SiO_2$, 3–15% $Li_2O$, 0–6% $Al_2O_3$, and 0–6% $K_2O$. The nucleating agent for this glass-ceramic is selected from the group consisting of 0–0.1% Pd and 0–5% $P_2O_5$; however if Pd is absent the $P_2O_5$ amount is at least 0.5% and if $P_2O_5$ is absent then the Pd amount is at least 0.005%. Additionally, up to 15% of optional ingredients may be added, including, $B_2O_3$, $Na_2O$, ZnO, MgO, CaO, SrO, $ZrO_2$, $TiO_2$, F, $Sb_2O_3$, $As_2O_3$, PbO and BaO.

14 Claims, 4 Drawing Sheets

GLASS-CERAMICS CONTAINING LITHIUM DISILICATE AND TRIDYMITE

FIELD OF THE INVENTION

This invention relates to a glass-ceramic having a crystal structure making it particularly suitable for use as a material for a magnetic memory disk substrate, specifically, the glass-ceramic material exhibits a predominate crystal phase assemblage consisting of an interlocking mixture of lithium disilicate and tridymite.

BACKGROUND OF THE INVENTION

Generally, a magnetic memory storage device consists, essentially of two fundamental units: a head pad and a rigid information disk. The head pad supports an element capable of reading or writing data magnetically on the information disk, while the information disk itself embodies two basic components, specifically a rigid substrate with a coating of magnetic media on its surface.

Aluminum alloys have been conventionally used as a substrate material for magnetic memory disks. The aluminum alloy, however, tends to produce a polished substrate surface having projections or spot-like projections and depressions due to defects inherent in the material. As a result, it is very difficult to prepare the aluminum alloy substrate such that it is sufficient in flatness and surface roughness so that it can cope with the recent requirement for high density recording necessitated by the desire for increased information storage per unit of surface area. In addition, aluminum has a tendency toward corrosion if there are any flaws in the protective coating which is typically applied.

Today's market for rigid magnetic storage is well established and growing, with even greater advances being foreseen through the utilization of thin film media technology. Increased information densities, higher disk rotation speeds, and lower head flying heights not only afford greater efficiencies in data storage and retrieval, but also demand extremely tight tolerances to be held in the substrate specifications for flatness, rigidity at high rotational velocities and surface texture. Where the product is designed for the high performance market, high capacity and rapid access characteristics are key requirements. Moreover, the current trend toward smaller disk drives and less powerful motors, particularly for the rapidly developing markets for slimline and portable drives, calls for thin, lightweight, rugged disks that have high functional densities and are capable of withstanding frequent takeoffs and landings with no deterioration in performance. As indicated above, the standard aluminum metal disk has difficulty meeting those enhanced performance requirements at a competitive cost.

Because of the inherent limitations of the aluminum-based substrates, research has been ongoing to discover potential alternative materials which would satisfy these enhanced requirements. Glass substrates, specifically chemically tempered glass, have been used in the art, however this material also possesses a number of shortcomings which limit its utility. Recently, research has led to the development of glass-ceramic materials suitable for use as substrates in magnetic memory devices. For example, U.S. Pat. No. 4,971,932 (Alpha et al.) discloses the fabrication of memory storage devices consisting of a head pad and a rigid information disk, with the disk consisting essentially of a rigid substrate possessing a surface coating of magnetic media. That reference particularly describes two different types of glass-ceramic materials suitable for use as substrate materials; the first, glass-ceramics containing chain silicate as the predominate crystal phase and the second, glass-ceramics containing a sheet silicate as the predominate crystal phase. In the patent, the sheet silicate crystals are disclosed as crystals consisting of fluor-phlogophite solid solution and tetrasilicic fluormica while chain silicate crystals are disclosed as crystals consisting of predominately canasite, predominately potassium fluorrichterite, or predominately potassium fluorrichterite with a substantial amount of cristobalite.

Japanese Patent Application Laid-open No. Sho 62-72457 discloses a glass-ceramic substrate consisting essentially, as expressed in weight percent, of 68–84% $SiO_2$, 3–20% $Li_2O$, 3–12% $Al_2O_3$, 0.5–3.0% $P_2O_5$, 8% or less $Na_2O$ and $K_2O$, 2.0% or less $ZrO_2$ and $As_2O_3$ and 1.5% or less $Sb_2O_3$. The crystal phases exhibited by the glass ceramic disclosed therein are lithium disilicate and lithium metasilicate.

Japanese Patent Application Publication No.210039-1988 discloses a glass-ceramic substrate consisting essentially, as expressed in weight percent, of 60–87% $SiO_2$, 5–15% $Li_2O$, 0–10% $Na_2O$, 0–10% $K_2O$, more than 0.5% MgO+CaO+SrO+BaO with the MgO ranging from 0–7.5%, the CaO 0–9.5%, the SrO 0–15% and the BaO 0–13%. In addition the composition is disclosed as containing 0–13% PbO, 0–13% ZnO, 0–10% $B_2O_3$, 0–10% $Al_2O_3$, 0.5–8.0% $P_2O_5$, 0–5% $TiO_2$, 0–3% $ZrO_2$, 0–3% $SnO_2$, 0–2% $As_2O_3$+$Sb_2O_3$ and 0–5% F. The crystal phases present in the glass-ceramic are disclosed to be lithium disilicate and α-cristobalite as the major crystal phase and lithium metasilicate and α-quartz as the minor crystal phases.

Although these glass-ceramic materials were better suited for use as a rigid disk substrate material than the prior art aluminum and glass materials, research has been extended to find better and more efficient materials. It is just such a material that the present invention is aimed at, and accordingly, the overriding objective of the present invention is to disclose a newly identified tridymite-containing glass-ceramic which provides the following advantages over traditional lithium disilicate glass-ceramics possessing free silica in the form of quartz or cristobalite: (1) fine grained, uniform and interlocking dispersion of lithium disilicate, tridymite and glass, as opposed to frequent clumping of silica in the form of spherulitic or coarse crystals, leading to the desirable combination of sufficient strength and a uniform texture on polishing, where tridymite protrudes above the average surface; (2) the fine lamellar polysynthetic or trilling twinning, characteristic of tridymite, creates a fracture toughness effect which can both increase strength and provide a topography or texture on the protruding crystals of a polished surface that is believed to enhance lubricity; (3) the optimized thermal expansion coefficient of the inventive tridymite-containing glass-ceramics (~120–140×$10^{-7}$/°C. over the range of 25–300° C.) when compared to prior art glass-ceramic materials containing other forms of free silica such as quartz or cristobalite, allowing for an appropriately matched bulk thermal expansion which better matches the currently used metal drive components associated with magnetic memory disc substrates.

SUMMARY OF THE INVENTION

The above described research has led to the invention of a glass-ceramic which is uniquely suited for use as a disc substrate for utilization in a magnetic memory storage device. The glass ceramic material exhibits a predominant crystal phase assemblage consisting of lithium disilicate ($Li_2Si_2O_5$) and tridymite and has a composition consisting

3 essentially, expressed in terms of weight percent on the oxide basis, of 75–95% $SiO_2$, 3–15% $Li_2O$, 0–6% $Al_2O_3$, 0–6% $K_2O$ and a nucleating agent for this glass-ceramic selected from the group consisting of 0–0.2% Pd and 0–5% $P_2O_5$. However, if Pd is absent the $P_2O_5$ amount is at least 0.5% and if $P_2O_5$ is absent then the Pd amount is at least 0.005%. Additionally, up to 15% of optional ingredients may be added, including, $B_2O_3$, $Na_2O$, ZnO, MgO, CaO, SrO, $ZrO_2$, $TiO_2$, F, $Sb_2O_3$, $As_2O_3$, PbO and BaO.

This carefully delineated inventive composition range is necessary to ensure that the resulting precursor glass combination will result, upon crystallization, in a lithium disilicate glass-ceramic which contains the required tridymite crystalline phase. The presence of this crystalline multiphase assemblage is important in order to ensure that the resulting glass-ceramic exhibits the requisite properties rendering the material suitable as a magnetic memory disk substrate, i.e., a high body strength, the proper coefficient of thermal expansion and a uniformly dispersed interlocking crystal microstructure yielding a polished glass-ceramic exhibiting a uniformly textured surface. For example, the preferred, later described composition possesses a modulus of rupture on abraded bars of approximately 20 kpsi and a linear coefficient of thermal expansion of approximately $120-140 \times 10^{-7}/°C$. (25–300° C.). Subsequently shown micrographs of the same composition and surface topology measurements will show that the material exhibits a uniformly textured surface due to its unique crystalline microstructure of uniformly distributed, interlocked lithium disilicate crystals, tridymite crystals and residual glass.

In order to promote the formation of the tridymite crystalline phase as one of the major forms of the crystalline silica accompanying the lithium disilicate in the glass-ceramic, it is necessary to formulate compositions higher in $SiO_2$ (75–95%, by weight) and lower in $Al_2O_3$ (approximately less than about 6%, by weight) than traditional lithium disilicate glass-ceramics containing the crystalline phases of quartz or cristobalite. Furthermore, it is critical to note that the specific heat-treatment schedule utilized is important to the proper development of the tridymite phase, i.e., the formation of the tridymite phase (nucleation and crystal growth) is time-temperature dependent.

DETAILED DESCRIPTION OF THE INVENTION

Figure 1:
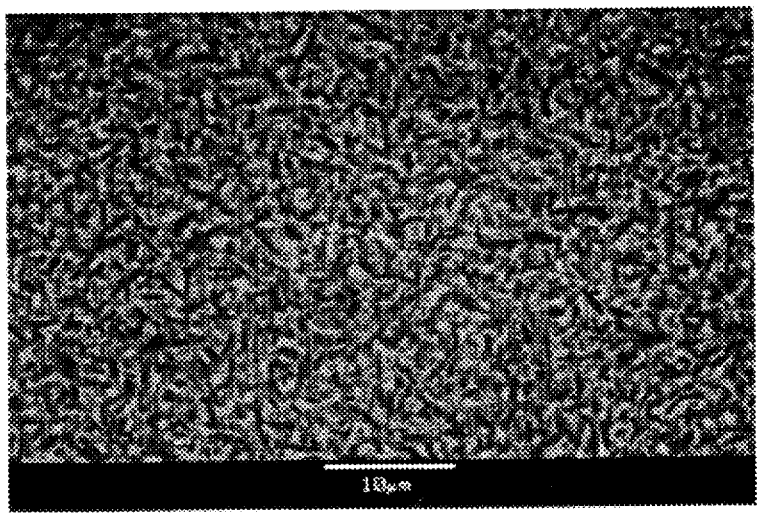
FIGS. 1–3 are scanning electron micrographs illustrating the interlocking microstructure/crystal phase assemblage of the inventive glass-ceramic designated as Example 5.

Glass-ceramics have been known in the art for at least thirty years. In general, glass-ceramics consist of randomly oriented crystals dispersed within a matrix of residual glass and can be produced through controlled internal nucleation and crystallization of a precursor glass body. Hence, a glass forming batch of a desired composition is melted; that melt is cooled and simultaneously formed into a glass shape of a predetermined configuration utilizing conventional glass forming techniques; that glass shape is heat treated in accordance with a predesigned schedule to induce nucleation and the growth of crystals on the nuclei; and thereafter, where necessary, the crystallized article is finished to precise dimensions and desired surface texture.

Glass forming, batches for the lithium disilicate tridymite-containing glass-ceramic precursor glasses are easily melted and the ensuing viscous melt can be shaped into articles of widely varying geometries. Table I specifically records a number of precursor glass compositions, expressed in terms of weight percent on the oxide basis, which when crystallized, illustrate the glass-ceramics operable in the present invention. The actual batch ingredients for the glasses can comprise many materials, either the oxides or other compounds, which, upon being melted together, will be converted into the desired glass forming melt containing the proper oxide proportions. For example, high purity sand is conveniently employed as the source of $SiO_2$, $Li_2CO_3$ as the source of $Li_2O$ and spodumene ($LiAlSi_2O_6$) as the source of $Al_2O_3$. Additionally, the source of the $P_2O_5$ can be either aluminum or potassium phosphate.

The batch materials were thoroughly mixed together in order to secure a homogeneous melt, and subsequently placed into silica and/or platinum crucibles. The crucibles were placed into a furnace and the glass batch was then melted and maintained at temperatures ranging from 1450–1600° C. for times ranging form about 6–16 hours. The melts were thereafter poured into steel molds to yield glass slabs having dimensions of approximately 4"×8"×½" (~20×107×1¼ cm). Subsequently, those slabs were transferred immediately to an annealer operating at about 475–480° C. Samples were held at this temperature for about 1–3 hours and subsequently cooled overnight.

After the glass slabs were removed from the annealer, glass tabs of approximately 1"×2"×½" (2½×1¼ cm) were cut from the slabs. These glass tabs were then subjected to one of the heat treatments reported in Table II, i.e. the glass tabs were crystallized in situ to form glass-ceramic tabs. These glass-ceramic tabs were ground, lapped and polished using standard techniques. Specifically, the tabs were ground using a Rudel-Blanchard Grinding Machine utilizing a 320 grit diamond/resin wheel for a period of time sufficient to remove enough material to result in a tab which was slightly larger (~0.0065–0.007") than the desired finished dimension. The tabs were then lapped with a Strasbourgh Lapping/Polishing Machine utilizing a $Al_2O_3$-based slurry (having an average particle size of approximately 7μm) for a time sufficient to remove about 0.006" of material from the surface. Following lapping, a Strasbourgh Polishing Machine utilizing a cerium oxide-based polishing compound (with an average particle size of approximately 3μm) was used to remove between about 0.0005–0.00075" of the surface. The tabs, once polished and possessing the desired dimension, were then measured for the properties reported herein.

Table II reports the major crystalline phases (Xtl phases) exhibited as a result of the heat treatment of the glass examples reported in Table I to form a glass-ceramic; T and L indicate tridymite and lithium disilicate ($Li_2Si_2O_5$) crystals respectively. Additionally, Table II reports the temperature at which the precursor glass was melted (Melt. temp.), the heat treatment schedule the precursor glass examples were subjected to (H. Treat.), the visual description (Appear.), the modulus of rupture on abraded samples (MOR) and the coefficient of thermal expansion (C.T.E.). All the resulting glass-ceramics appeared white (wh.) and exhibited a cherty fracture surface (ch.)

It will be recognized that, whereas the above description is drawn to laboratory practice, the glasses operable in the invention described herein can be melted in large scale/commercial melting tanks and formed into desired shapes using conventional glass melting techniques and forming processes. It is only necessary that the compositions be fired at sufficiently high temperatures and for a sufficient length of time to produce a homogeneous melt, and thereafter the melt is cooled and simultaneously shaped into a glass body which is customarily annealed.

Moreover, it should be recognized that various heat-treatment cycles may be used to produce unique microstructures. These microstructures are tailored to provide different mechanical and tribological properties, e.g., strength, toughness and surface texture after polishing. Furthermore, it should be noted while an example of polishing technique has been previously described, various parameters including polishing slurry type and pH, polishing pads, lapping pressure, etc., may be varied to allow for improved manufacturing efficiency or unique surface qualities.

TABLE III

| Heat Treatment Designation | Heat Treatment Schedule |
| --- | --- |
| A | Room temperature to 500° C. at 300°/hour<br>Hold at 500° C. for 2 hours<br>Raise to 850° C. at 300° C./hour<br>Hold at 850° C. for 4 hours<br>Cool to room temperature at furnace rate. |
| B | Room temperature to 650° C. at 300° C./hour<br>Hold at 650° C. for 1 hours<br>Raise to 850° C. at 300° C./hour<br>Hold at 850° C. for 2 hours<br>Cool to room temperature at furnace rate. |
| C | Room temperature to 650° C. at 300° C./hour<br>Hold at 650° C. for 2 hours<br>Raise to 850° C. at 300° C./hour<br>Hold at 850° C. for 4 hours<br>Cool to room temperature at furnace rate. |

Table IV reports the precursor glass composition of two lithium disilicate glass-ceramic examples which were produced in generally the same method as described above for the tridymite-containing glass-ceramic. However, as the Table reports, although compositionally, precursor glasses of Example 13A and 14A are within the inventive scope, the crystalline phase assemblage generated following the heat

TABLE I

| | 1 | 2 | 3 | 4 | 5 | 6 | 7 | 8 | 9 | 10 | 11 | 12 | 13 |
| --- | --- | --- | --- | --- | --- | --- | --- | --- | --- | --- | --- | --- | --- |
| $SiO_2$ | 81.6 | 83.9 | 86.7 | 79.6 | 80.9 | 81.2 | 82.0 | 80.3 | 81.6 | 84.0 | 82.0 | 80.3 | 80.3 |
| $A_2O_3$ | — | — | — | 2.3 | 2.0 | 2.0 | 2.0 | 2.3 | 2.3 | 2.0 | 2.0 | 2.3 | 2.3 |
| $Li_2O$ | 9.7 | 7.8 | 5.9 | 10.0 | 10.0 | 10.0 | 9.0 | 10.0 | 10.5 | 8.0 | 9.0 | 10.0 | 10.0 |
| CaO | 1.0 | 1.0 | 1.0 | 1.0 | 1.0 | 1.0 | 1.0 | 1.0 | 1.0 | 1.0 | 1.0 | — | — |
| $K_2O$ | 2.9 | 2.9 | 2.9 | 3.2 | 3.0 | 3.0 | 3.0 | 3.0 | 3.2 | 2.0 | 4.5 | 3.0 | 3.0 |
| BaO | — | — | — | — | — | — | — | — | — | — | — | — | 1.0 |
| ZnO | 1.9 | 2.0 | 2.0 | 1.5 | 1.0 | 1.0 | 1.0 | 1.0 | 1.0 | 1.0 | — | 1.0 | 1.0 |
| $Sb_2O_3$ | — | — | — | 0.4 | 0.4 | 0.4 | 0.4 | 0.4 | 0.4 | 0.4 | 0.4 | 0.4 | 0.4 |
| SrO | — | — | — | — | — | — | — | — | — | — | — | 1.0 | — |
| Pd | — | — | — | — | — | — | — | — | 0.05 | — | — | — | — |
| $P_2O_5$ | 2.9 | 2.4 | 1.5 | 2.0 | 1.7 | 1.4 | 1.5 | 2.0 | — | 1.6 | 1.6 | 2.0 | 2.0 |

TABLE II

| | 1 | 2 | 3 | 4 | 5 | 6 | 7 | 8 | 9 | 10 | 11 | 12 | 13 | 14 |
| --- | --- | --- | --- | --- | --- | --- | --- | --- | --- | --- | --- | --- | --- | --- |
| Melt temp. (°C.) | 1600 | 1600 | 1600 | 1500 | 1500 | 1500 | 1500 | 1500 | 1500 | — | — | — | — | — |
| H.Treat. | A | A | A | B | B | B | B | B | B | B | B | B | C | A |
| Appear. | w, ch | w, ch | w, ch | w, ch | w, ch | w, ch | w, ch | w, ch | w, ch | w, ch | w, ch | w, ch | w, ch | w, ch |
| MOR(ksi) | 27.1 | 21.3 | 21.5 | 18.6 | 19.9 | 23.0 | 17.8 | 18.1 | — | — | — | — | — | — |
| Major Xtal phases | T, L | T, L | T, L | T, L | T, L | T, L | T, L | T, L | T, L | T, L | T, L | T, L | T, L | T, L |
| C.T.E. ($\times 10^{-7}$°C.) (25–300° C.) | | | | 124 | 140 | 127 | | | | | | | | | treatment is not that which is exhibited by the inventive glass-ceramics. Thus, it can be inferred that the heat-treatment utilized is as important in generating the proper phase assemblage as utilizing the proper precursor glass composition.

TABLE IV

|  | 13A | 14A |
|---|---|---|
| SiO2 | 80.3 | 79.6 |
| Al2O3 | 2.3 | 3.0 |
| Li2O | 10.0 | 10.0 |
| K2O | 3.0 | 3.0 |
| BaO | 1.0 | — |
| CaO | — | 1.0 |
| ZnO | 1.0 | 1.0 |
| P2O5 | 2.0 | 2.0 |
| Sb2O3 | 0.4 | 0.4 |
| H. Treat. | B | C |
| Major Xtal Phases | L,C | L,C |

Figure 2:
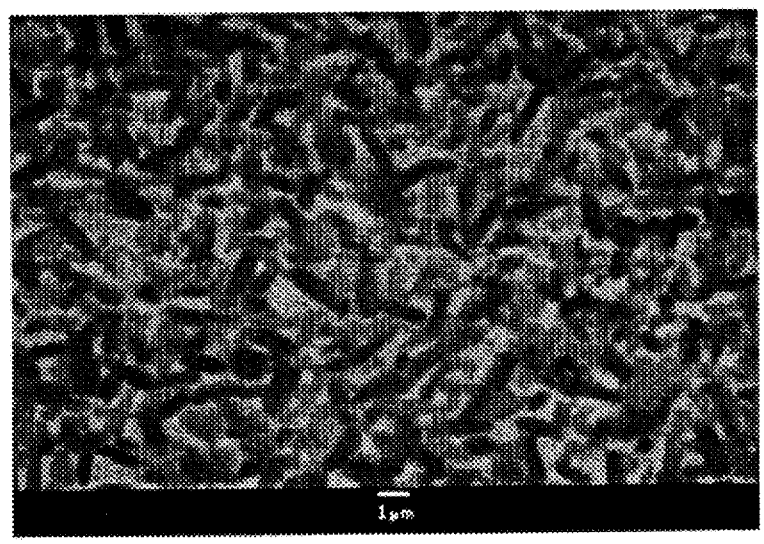
Figure 3:
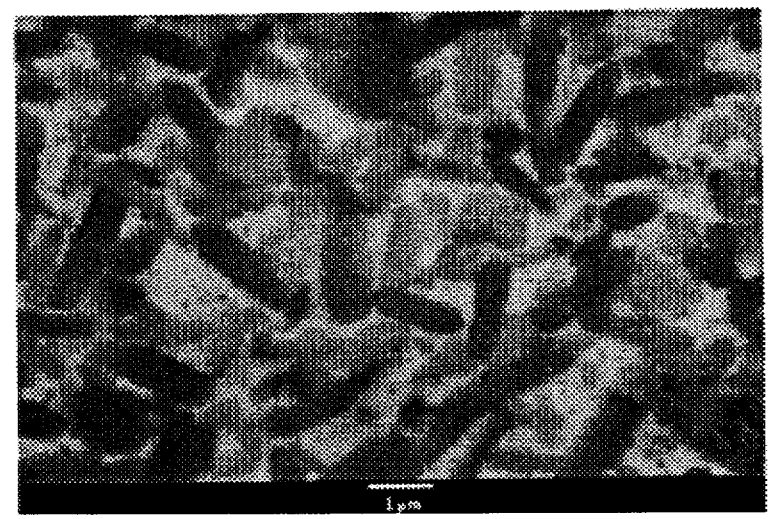

FIGS. 1–3 are scanning electron micrographs taken at magnifications of 2000, 5000 and 10,000× respectively, of a polished section of the inventive glass-ceramic article reported above as Example 5. The bars at the bottom of the micrographs represent 10, 1 and 1 microns, respectively. As can be observed in the micrographs, there are three phases present in the resulting microstructure; the residual glass phase appears white, the lithium disilicate crystals black and the tridymite crystals gray. In addition, it is also apparent from the micrographs that the lithium disilicate and the tridymite crystals are uniformly dispersed within the residual glass and exhibit a generally more uniform and finer crystal size (~≦4μm) than that typical of other lithium silicate-silica glass-ceramics heated near 850° C. Moreover, the lithium disilicate clearly forms an interlocking network with the tridymite and the residual glass.

Figure 4:
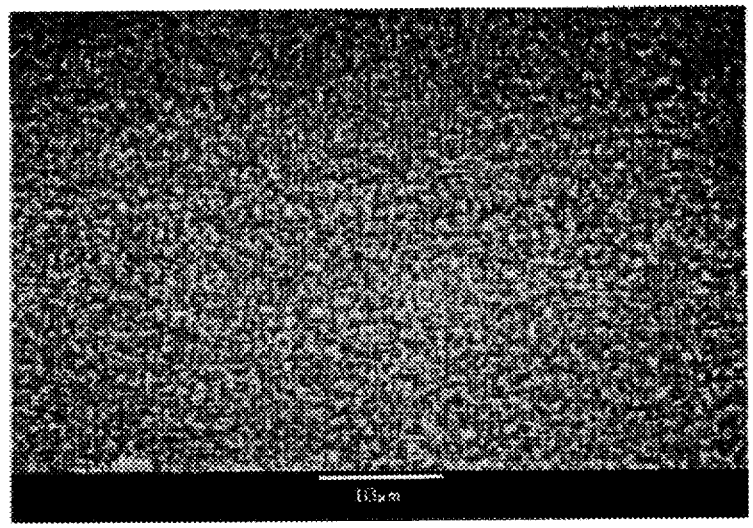
FIGS. 4–6 are scanning electron micrographs illustrating the interlocking microstructure/crystal phase assemblage of the inventive glass-ceramic designated as Example 4.
Figure 5:
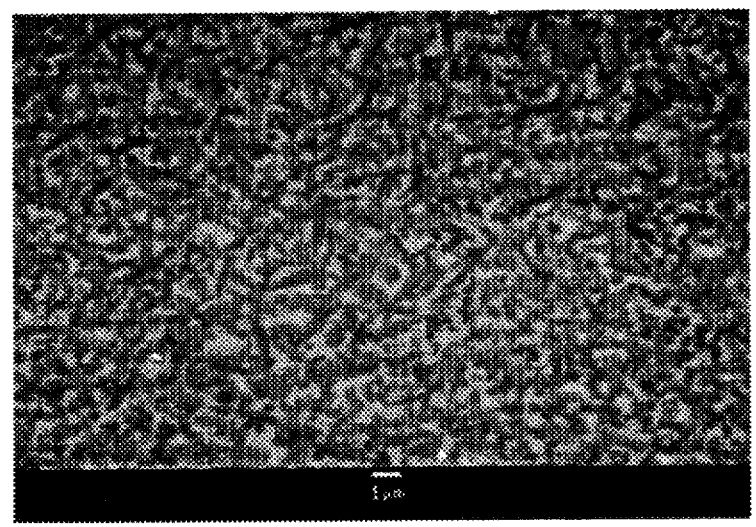
Figure 6:
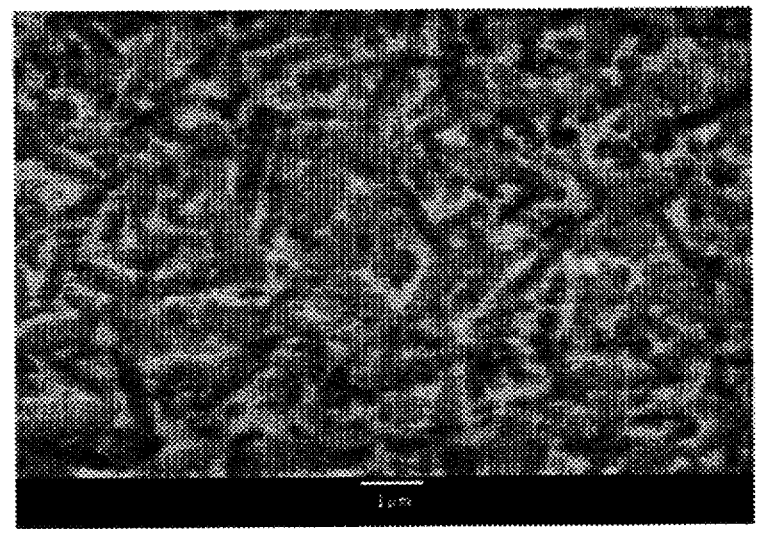

FIGS. 4–6 are scanning electron micrographs taken at magnifications of 2000, 5000 and 10,000× respectively, of a polished section of the inventive glass ceramic article reported above as Example 4. The bars at the bottom of the micrographs represent 10, 1 and 1 microns, respectively. Again, upon observation, the resulting glass-ceramic microstructure consists of three phases; the white residual glass phase, the black lithium disilicate crystals and the gray tridymite crystals. The lithium disilicate and the tridymite crystals again appear to be finer grained and more uniformly interspersed with the residual glass than is typical for other glass-ceramics containing quartz and cristobalite, in addition to being interlocked with the glass phase.

Figure 7:
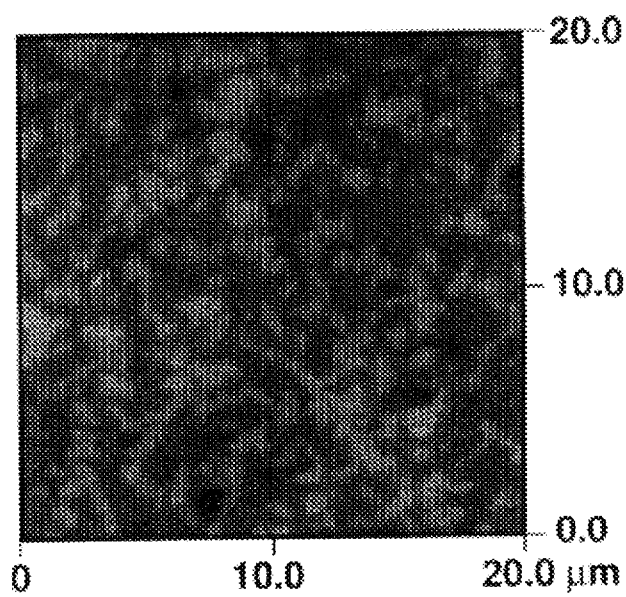
FIG. 7 is an atomic force micrograph illustrating the surface roughness/crystal phase microstructure of the Example 5 glass-ceramic.

FIG. 7 is an atomic force micrograph illustrating the surface roughness/crystal phase microstructure of the Example 5 glass-ceramic. The scale of the micrograph is 20×20 μm. The image statistics/roughness analysis results revealed by this micrograph are a $R_a$ of 6.2 nm and a $R_{max}$ of 62.98 nm. However, it should be noted that other compositions, within this claimed scope, and heat-treatment schedules may be employed to obtain different surface textures than that which appears in this micrograph. Examination of the micrograph supports the earlier observation that the lithium disilicate and the tridymite crystals are uniformly dispersed within the glass matrix. Additionally, the examination reveals that the surface texture (roughness) corresponds with the internal microstructure, with the tridymite standing above the mean surface topology.

Figure 8:
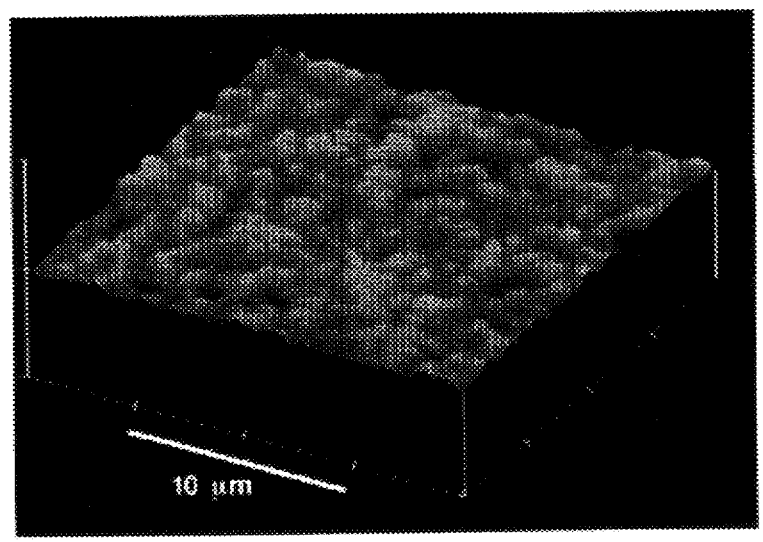
FIG. 8 is an atomic force micrograph, 3-D view of FIG. 7., illustrating the surface roughness/crystal phase microstructure of the inventive glass-ceramic.

FIG. 8 is an atomic force micrograph, 3-D view of FIG. 7, illustrating the surface roughness/crystal phase microstructure of the inventive glass-ceramic. The X and Y dimensions of this micrograph are 20 μm and 20 μm respectively. Once again, as can be observed from this micrograph, the resulting surface, following polishing, is quite uniformly textured. As was earlier indicated, this is a result of the uniform distribution of the lithium disilicate and tridymite crystals within the residual glass phase. Specifically, the harder tridymite crystals protrude above the lithium disilicate crystals and the residual glass following polishing, thus resulting in a uniformly textured surface.

Figure 9:
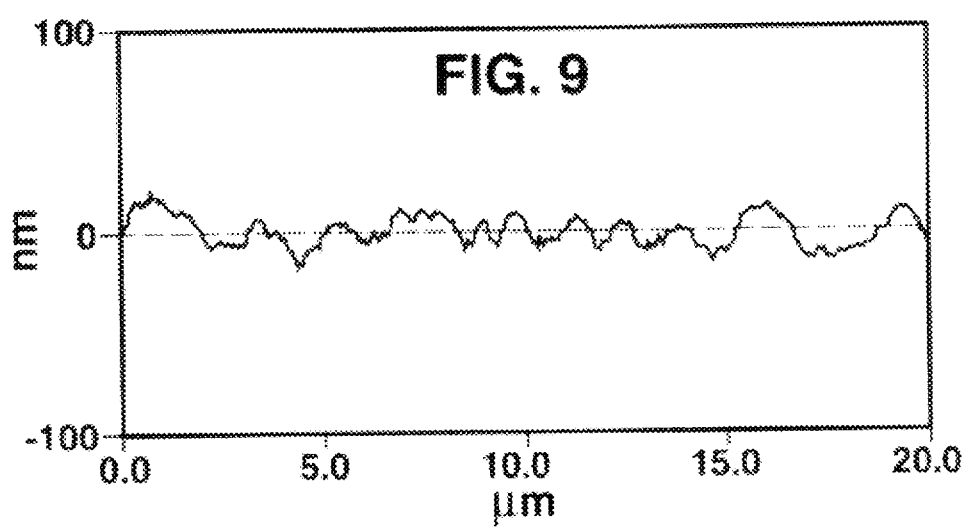
FIG. 9 is a cross-sectional profile illustrating the surface roughness of the inventive glass-ceramic designated as Example 5.

FIG. 9 is a cross-sectional profile, taken along line A—A of FIG. 7, illustrating the surface roughness of the inventive glass-ceramic designated as Example 5. This figure lends support to the observation revealed in FIG. 9 that the surface which forms as a result of polishing, is uniformly textured; again due to the internal microstructure which has been seen as a uniform distribution of lithium disilicate and tridymite crystals, and the residual glass. The harder tridymite crystals which are uniformly distributed throughout the surface and protrude above the lithium disilicate crystals and the residual glass following polishing, are represented by the peaks in the profile which rise above the 0 nm mark.

Figure 10:
FIG. 10 is a transmission electron micrograph illustrating the crystal shape of the tridymite and lithium disilicate crystal phases of the inventive glass-ceramic.

FIG. 10 is a transmission electron micrograph taken at a magnification of 100,000× of a thin section of the inventive glass-ceramic article earlier designated as Example 4. The bar at the bottom of the micrograph represents 0.1 μm. Tridymite crystals can be seen upon observation of this micrograph which reveal the lamellar, trilling type of twinning characteristically exhibited by this form of silica.

As earlier mentioned, materials most suitable for magnetic memory disc substrates should exhibit a uniform surface texture accompanied by a relatively fine crystalline microstructure. This material characteristic results in an optimal interaction/performance between the subsequently magnetically coated disc and the magnetic head. The above micrographs reveal that the inventive tridymite-containing glass-ceramic possesses a uniformly distributed mixture of fine crystals of lithium disilicate and tridymite which form an interlocking microstructure with the residual glass. As a result of this microstructure, the surface obtained is one which exhibits the desired uniformly textured surface which should, in theory, perform better than those materials which currently exist and are utilized as substrates. For example, it has been determined that lithium disilicate-based glass-ceramic compositions exhibiting other forms of free silica besides tridymite, i.e., quartz and cristobalite, generally exhibit a non-uniformly distributed and rounded/globular crystal microstructure. It is theorized that because these crystalline morphologies are typically coarser and spherulitic/rounded and not as uniform as that possessed by the inventive glass-ceramic, they should not possess the uniformly textured surface desired and ultimately will not perform as well as the tridymite-containing lithium disilicates in magnetic memory disk drive units.

In addition to exhibiting properties which were exhibited by the prior art lithium disilicate materials usable as rigid disk substrates, i.e., a hard surface, a precise surface flatness, and excellent chemical durability, the resultant inventive tridymite crystal-containing glass-ceramics possess a number of properties which are enhanced. These properties, which render the inventive glass-ceramics eminently suitable for high performance rigid disk substrates, specifically include:

(1) High body strengths as reflected in modulus of rupture (abraded) values exceeding about 18 kpsi;

(2) A body with a uniform lithium silicate/tridymite crystal distribution which allows for the production of glass-ceramic bodies exhibiting I uniformly textured surface where tridymite crystals protrude above the average surface;

(3) An optimized thermal expansion coefficient ranging from about $120-140\times10^{-7}$ °C. over the temperature range 25-300° C. versus lithium disilicate glass-ceramic materials containing quartz or cristobalite, allowing these inventive glass-ceramics to better match metal drive components used with magnetic memory disc substrates; and, (4) A greater strength-to-weight ratio than prior art lithium disilicate quartz/cristobalite glass-ceramics due to both the interlocking microstructure and the lower density of tridymite relative to quartz and cristobalite.

Based on its overall combination of properties, Example 5 is deemed to be the most preferred composition.

We claim:

1. A magnetic memory storage device comprising a head pad and rigid information disk, the disk comprising a rigid disc substrate having a layer of magnetic media on the surface thereof, wherein the substrate consists essentially of a glass-ceramic material, said glass-ceramic material comprised of a plurality of lithium disilicate crystals and a plurality of tridymite crystals, said glass-ceramic material having a composition consisting essentially, expressed in terms of weight percent on the oxide basis, of 75–95% $SiO_2$, 3–15% $Li_2O$, 0–6% $Al_2O_3$, 0–6% $K_2O$ and a nucleating agent selected from the group consisting of 0–0.2% Pd and 0–5% $P_2O_5$ with the proviso that if Pd is absent the $P_2O_5$ amount is at least 0.5% and if $P_2O_5$ is absent then the Pd amount is at least 0.005%, and up to 15% of optional ingredients in the indicated proportions selected from the group consisting of $B_2O_3$, $Na_2O$, ZnO, MgO, CaO, SrO, $ZrO_2$, $TiO_2$, F, $Sb_2O_3$, $As_2O_3$, PbO and BaO.

2. A magnetic memory storage device according to claim 1 wherein the glass-ceramic material has a composition consisting essentially, expressed in terms of weight percent on the oxide basis, of 78–85% $SiO_2$, 7–12% $Li_2O$, 1–2.5% $P_2O_5$, 1.5–3% $Al_2O_3$, 1–6% $K_2O$ and up to 5% of optional ingredients in the indicated proportions selected from the group consisting of $B_2O_3$, $Na_2O$, ZnO, MgO, CaO, SrO, $ZrO_2$, $TiO_2$, F, $Sb_2O_3$, $As_2O_3$, PbO and BaO.

3. A magnetic memory storage device according to claim 1 wherein the glass-ceramic material has a composition consisting essentially, expressed in terms of weight percent on the oxide basis, of 79–83% $SiO_2$, 8.5–11.0% $Li_2O$, 1–2% $P_2O_5$, 2.0–2.5% $Al_2O_3$, 3.0–3.5% $K_2O$, 1–2.0% ZnO, 1–2.0% CaO and 0.1–1.0% $Sb_2O_3$.

4. A magnetic memory storage device according to claim 1 wherein the glass-ceramic material has a composition, expressed in terms of weight percent on the oxide basis, of 80.9% $SiO_2$, 10.0% $Li_2O$, 1.7% $P_2O_5$, 2.0% $Al_2O_3$, 3.0% $K_2O$, 1.0% ZnO, 1.0% CaO and 0.4% $Sb_2O_3$.

5. A rigid information disk for use in a magnetic memory storage device consisting essentially of a substrate with a coating of magnetic media on a surface thereof, wherein the substrate consists essentially of a glass-ceramic material, said glass-ceramic material comprised of a plurality of lithium disilicate crystals and a plurality of tridymite crystals, said glass-ceramic material exhibiting a composition consisting essentially, expressed in terms of weight percent on the oxide basis, of 75–95% $SiO_2$, 3–15% $Li_2O$, 0.3–5% $P_2O_5$, 0–6% $Al_2O_3$, 0–6% $K_2O$ and a nucleating agent selected from the group consisting of 0–0.2% Pd and 0–5% $P_2O_5$ with the proviso that if Pd is absent the $P_2O_5$ amount is at least 0.5% and if $P_2O_5$ is absent then the Pd amount is at least 0.005% and up to 15% of optional ingredients in the indicated proportions selected from the group consisting of $B_2O$, $Na_2O$, ZnO, MgO, CaO, SrO, $ZrO_2$, $TiO_2$, F, $Sb_2O_3$, $As_2O_3$, PbO and BaO.

6. A rigid information disk according to claim 5 wherein the glass-ceramic material has a composition consisting essentially, expressed in terms of weight percent on the oxide basis, of 78–85% $SiO_2$, 7–12% $Li_2O$, 1–2.5% $P_2O_5$, 1.5–3% $Al_2O_3$, 1–6% $K_2O$ and up to 5% of optional ingredients in the indicated proportions selected from the group consisting of $B_2O_3$, $Na_2O$, ZnO, MgO, CaO, SrO, $ZrO_2$, $TiO_2$, F, $Sb_2O_3$, $As_2O_3$, PbO and BaO.

7. A rigid information disk according to claim 5 wherein the glass-ceramic material has a composition consisting essentially, expressed in terms of weight percent on the oxide basis, of 79–83% $SiO_2$, 8.5–11.0% $Li_2O$, 1–2% $P_2O_5$, 2.0–2.5% $Al_2O_3$, 3.0–3.5% $K_2O$, 1–2.0% ZnO, 1–2.0% CaO and 0.1–1.0% $Sb_2O_3$.

8. A rigid information disk according to claim 5 wherein the glass-ceramic material has a composition, expressed in terms of weight percent on the oxide basis, of 80.9% $SiO_2$, 10.0% $Li_2O$, 1.7% $P_2O_5$, 2.0% $Al_2O_3$, 3.0% $K_2O$, 1.0% ZnO, 1.0% CaO and 0.4% $Sb_2O_3$.

9. A glass-ceramic article, said glass-ceramic article comprised of a plurality of lithium disilicate crystals and a plurality of tridymite crystals, said glass-ceramic article having a composition consisting essentially, expressed in terms of weight percent on the oxide basis, of 75–95% $SiO_2$, 3–15% $Li_2O$, 0.3–5% $P_2O_5$, 0–6% $Al_2O_3$, 0–6% $K_2O$ and a nucleating agent selected from the group consisting of 0–0.2% Pd and 0–5% $P_2O_5$ with the proviso that if Pd is absent the $P_2O_5$ amount is at least 0.5% and if $P_2O_5$ is absent then the Pd amount is at least 0.005% and up to 15% of optional ingredients in the indicated proportions selected from the group consisting of $B_2O_3$, $Na_2O$, ZnO, MgO, CaO, SrO, $ZrO_2$, $TiO_2$, F, $Sb_2O_3$, $As_2O_3$, PbO and BaO.

10. The glass-ceramic article according to claim 9 wherein the glass-ceramic article comprises a residual glass phase, said residual glass phase is interlocked with said plurality of lithium disilicate crystals and said plurality of tridymite crystals.

11. The glass-ceramic article according to claim 10 wherein the tridymite crystals possess a size no greater than about 4 vm.

12. The glass-ceramic article according to claim 9 wherein the composition consists essentially, expressed in terms of weight percent on the oxide basis, of 78–85% $SiO_2$, 7–12% $Li_2O$, 1–2.5% $P_2O_5$, 1.5–3% $Al_2O_3$, 1–6% $K_2O$ and up to 5% of optional ingredients in the indicated proportions selected from the group consisting of $B_2O_3$, $Na_2O$, ZnO, MgO, CaO, SrO, $ZrO_2$, $TiO_2$, F, $Sb_2O_3$, $As_2O_3$, PbO and BaO.

13. The glass-ceramic article according to claim 9 wherein the composition consists essentially of, expressed in terms of weight percent on the oxide basis, of 79–83% $SiO_2$, 8.5–11.0% $Li_2O$, 1–2% $P_2O_5$, 2.0–2.5% $Al_2O_3$, 3.0–3.5% $K_2O$, 1–2.0% ZnO, 1–2.0% CaO and 0.1–1.0% $Sb_2O_3$.

14. The glass-ceramic according to claim 9 wherein the composition consists, expressed in terms of weight percent on the oxide basis, of 80.9% $SiO_2$, 10.0% $Li_2O$, 1.7% $P_2O_5$, 2.0% $Al_2O_3$, 3.0% $K_2O$, 1.0% ZnO, 1.0% CaO and 0.4% $Sb_2O_3$.

* * * * *